(12) United States Patent
Buehler et al.

(10) Patent No.: US 10,218,430 B2
(45) Date of Patent: Feb. 26, 2019

(54) INTEGRATED MIXED-SIGNAL ASIC WITH DAC AND DSP

(71) Applicant: SEAKR ENGINEERING, INC., Centennial, CO (US)

(72) Inventors: Erik Buehler, Castle Rock, CO (US); Damon Van Buren, Parker, CO (US); Paul Rutt, Longmont, CO (US)

(73) Assignee: SEAKR ENGINEERING, INC., Centennial, CO (US)

( * ) Notice: Subject to any disclaimer, the term of this patent is extended or adjusted under 35 U.S.C. 154(b) by 0 days.

(21) Appl. No.: 15/351,224

(22) Filed: Nov. 14, 2016

(65) Prior Publication Data

US 2017/0063446 A1    Mar. 2, 2017

Related U.S. Application Data

(63) Continuation of application No. 15/263,134, filed on Sep. 12, 2016, which is a continuation of application
(Continued)

(51) Int. Cl.
*H04B 1/00* (2006.01)
*H04B 7/185* (2006.01)
(Continued)

(52) U.S. Cl.
CPC ....... *H04B 7/18515* (2013.01); *H04B 1/0039* (2013.01); *H04B 1/0042* (2013.01);
(Continued)

(58) Field of Classification Search
CPC .. H04B 1/0007; H04B 1/0014; H04B 1/0017; H04B 1/0021; H04B 1/0028;
(Continued)

(56) References Cited

U.S. PATENT DOCUMENTS 5,375,146 A   12/1994 Chalmers
5,579,341 A   11/1996 Smith et al.
(Continued)

FOREIGN PATENT DOCUMENTS

CA    2542445 A1   10/2007
EP    1143554 A2   10/2001
(Continued)

OTHER PUBLICATIONS

Berger, et al, "A System-On-Chip Radiation Hardened Microcontroller A SIC with Embedded SpaceWire Router," 2007, International SpaceWire Conference, Dunde, Scotland, Sep. 19, 2007, pp. 1-15.
(Continued)

*Primary Examiner* — Young T Tse
(74) *Attorney, Agent, or Firm* — Robert G. Crouch; Marsh Fischmann & Breyfogle LLP

(57) ABSTRACT

An integrated analog to digital converting and digital to analog converting (ADDA) RF transceiver for satellite applications, configured to replace conventional analog RF down and up conversion circuitry. The ADDA RF transceiver includes one of more ADCs, DSPs, and DACs, all on a single ASIC. Further, the circuity is to be radiation tolerant for high availability and reliability in the ionizing radiation environment present in the space environment.

28 Claims, 9 Drawing Sheets

Related U.S. Application Data

No. 14/828,126, filed on Aug. 17, 2015, now Pat. No. 9,461,732.

(60) Provisional application No. 62/037,816, filed on Aug. 15, 2014.

(51) Int. Cl.
*H04B 7/212* (2006.01)
*H04B 1/44* (2006.01)
*H04B 7/08* (2006.01)

(52) U.S. Cl.
CPC ............ *H04B 1/0046* (2013.01); *H04B 1/44* (2013.01); *H04B 7/08* (2013.01); *H04B 7/1851* (2013.01); *H04B 7/212* (2013.01)

(58) Field of Classification Search
CPC .. H04B 1/0032; H04B 1/0035; H04B 1/0039; H04B 1/0042; H04B 1/0046; H04B 1/06; H04B 1/16; H04B 1/44; H04B 7/08; H04B 7/1851; H04B 7/18515; H04B 7/18528; H04B 7/212
USPC ....... 375/316, 320, 322, 324, 326–328, 340, 375/344, 345; 341/61, 108, 110, 128, 341/129, 144, 155, 159; 710/3, 4, 69–71
See application file for complete search history.

(56) References Cited

U.S. PATENT DOCUMENTS

| | | | |
|---|---|---|---|
| 5,640,424 A | 6/1997 | Banavong et al. | |
| 5,717,717 A | 2/1998 | Yang et al. | |
| 5,867,478 A | 2/1999 | Baum et al. | |
| 5,956,346 A | 9/1999 | Levan | |
| 5,959,660 A | 9/1999 | Levan | |
| 6,212,566 B1 | 4/2001 | Vanhoof et al. | |
| 6,359,508 B1 | 3/2002 | Mucenieks | |
| 6,445,334 B1 | 9/2002 | Bradley et al. | |
| 6,479,758 B1 | 11/2002 | Arima et al. | |
| 6,624,780 B1 | 9/2003 | Fouts et al. | |
| 6,701,141 B2 | 3/2004 | Lam | |
| 6,721,371 B1 | 4/2004 | Barham et al. | |
| 6,842,498 B2 | 1/2005 | Heinzl et al. | |
| 6,898,233 B2 | 5/2005 | Philips et al. | |
| 6,934,341 B2 | 8/2005 | Sahlman | |
| 7,099,949 B1 | 8/2006 | Vanhoof et al. | |
| 7,400,036 B2 | 7/2008 | Tan | |
| 7,408,898 B1* | 8/2008 | Brown | H04B 7/18515 375/316 |
| 7,471,739 B1 | 12/2008 | Wright | |
| 7,962,662 B2 | 6/2011 | Richards et al. | |
| 8,139,685 B2 | 3/2012 | Simic et al. | |
| 8,174,428 B2 | 5/2012 | Wegener | |
| 8,331,461 B2 | 12/2012 | Wegener | |
| 8,380,138 B2 | 2/2013 | Wadhwa et al. | |
| 8,406,707 B2 | 3/2013 | Pullela et al. | |
| 8,457,021 B2 | 6/2013 | Schiff | |
| 8,463,142 B2 | 6/2013 | Zhao et al. | |
| 8,489,056 B2 | 7/2013 | Wyville | |
| 8,625,726 B2 | 1/2014 | Kuan et al. | |
| 8,659,309 B2 | 2/2014 | Howe et al. | |
| 8,744,009 B2 | 6/2014 | Kleider et al. | |
| 9,197,260 B2 | 11/2015 | Adnani et al. | |
| 9,294,118 B2 | 3/2016 | Man et al. | |
| 2002/0122503 A1* | 9/2002 | Agazzi | H03M 1/0624 375/316 |
| 2003/0054788 A1 | 3/2003 | Sugar et al. | |
| 2003/0118081 A1 | 6/2003 | Philips et al. | |
| 2005/0027409 A1* | 2/2005 | Marshall | G06F 15/7867 701/13 |
| 2006/0028197 A1 | 2/2006 | Quiquempoix | |
| 2009/0163162 A1 | 6/2009 | Hoffman et al. | |
| 2010/0269022 A1* | 10/2010 | Clark | G06F 9/3867 714/764 |
| 2011/0170619 A1* | 7/2011 | Anvari | H04L 12/40169 375/259 |
| 2012/0250740 A1 | 10/2012 | Ling | |
| 2012/0300818 A1 | 11/2012 | Metreaud et al. | |
| 2013/0230078 A1 | 9/2013 | Chang et al. | |
| 2014/0213174 A1 | 7/2014 | Scarpa et al. | |
| 2014/0268964 A1 | 9/2014 | Xia et al. | |
| 2014/0369677 A1* | 12/2014 | Tanaka | H04B 10/50 398/25 |
| 2015/0188646 A1 | 7/2015 | Bharadia et al. | |
| 2015/0236750 A1 | 8/2015 | Choi et al. | |
| 2015/0280893 A1 | 10/2015 | Choi et al. | |
| 2015/0318914 A1* | 11/2015 | Scott | H04B 7/18513 370/319 |
| 2015/0365177 A1* | 12/2015 | Blumenthal | H04B 10/40 398/9 |
| 2016/0112226 A1 | 4/2016 | Martinez et al. | |
| 2016/0127112 A1 | 5/2016 | Shalizi et al. | |

FOREIGN PATENT DOCUMENTS

| | | |
|---|---|---|
| EP | 1168883 | 1/2002 |
| EP | 1589774 A1 | 10/2005 |
| EP | 1029397 B1 | 8/2006 |
| EP | 1938563 A2 | 7/2008 |
| WO | 2014052925 A1 | 4/2014 |
| WO | 2015031830 A1 | 3/2015 |

OTHER PUBLICATIONS

Sinclair, et al, "Radiation Effects and COTS Parts in SmallSats," Proceedings of 27th Annual AIAA/USU Conference on Small Satellites, Logan, UT, Aug. 1, 2013, pp. 1-12.
Extended European Search Report for Application No. 15831698.3.
Office Action for U.S. Appl. No. 15/263,134, dated Sep. 12, 2017.
Office Action for U.S. Appl. No. 15/263,134, dated Jan. 9, 2018.
MIL-PRF-38535K, Dec. 20, 2013, pp. 1 and 63.
https://learn.sparkfun.com/tutorials/integrated circuits; Integrated Circuits—learn.sparkfun.com; Integrated circuits; Mar. 19, 2018.
Glossary of Terms—Semiconductor Industry Association; https:www.semiconductors.org/faq/glossary, Apr. 2, 2018.
Wikipedia, Semiconductor package; https://en.wikipedia.org/wiki/semiconductor_package, Apr. 2, 2018.
Wikipedia, Integrated Circuit; https://en.wikipedia.org/wiki/Integrated_Circuit; Jul. 11, 2018.
WhatIs.com; What is monolithic?; https://whatis.techtarget.com/definition/monolithic; Jul. 11, 2018.
https://www.collinsdictionary.com/us/dictionary/english/monolithic; Jul. 11, 2018.

\* cited by examiner

INTEGRATED MIXED-SIGNAL ASIC WITH DAC AND DSP

CROSS REFERENCE TO RELATED APPLICATIONS

This application is a continuation of U.S. patent application Ser. No. 14/828,126, filed on Aug 15, 2015, now U.S. Pat. No. 9,461,732, which claims priority from U.S. Provisional Patent Application No. 62/037,816, filed Aug. 15, 2014, the contents of each of which are hereby incorporated by reference in their entirety.

BACKGROUND

Current designs for down-converters and up-converters in satellite applications typically utilize amplifiers that use high power and have a high mass/weight, along with mixers, oscillators, and heavy filter banks. Such devices consume an undesirable amount of Size, Weight, Power, and Cost (SWaPC) and, because of the high part count, such devices have poorer than desired reliability and are difficult and time consuming to manufacture and test.

The harsh environment faced by a satellite can increase the challenge of designing electronic circuitry. One of the primary environmental risks in a satellite application is associated with the ionizing radiation environment present in space. It should be noted that radiation effects associated with ionizing radiation are also present in terrestrial applications, though the rate of occurrence in terrestrial applications is significantly lower than in space applications. The radiation environment in space includes heavy ions, protons, and neutrons which can temporarily impact the normal operation of semiconductor devices via single event effects (SEE). Additionally total ionizing dose (TID), and/or displacement damage dose (DDD) effects are caused by long-term exposure to radiation accumulated during the mission duration and impact semiconductor performance through parametric degradation including current leakage and timing shifts. Reference may be made to "Single Event Effects in Aerospace" by Edward Petersen, October. 2011. ISBN-10: 0470767499; ISBN-13: 978-0470767498, the entire contents of which may be incorporated herein in their entirety.

The effects of SEE are generally instantaneous and can impact the operation of the semiconductor circuit. These SEE effects include single event latchup (SEL), single event upset (SEU), single event transient (SET), and single event functional interrupt (SEFI). Mitigation for SEL can be provided via use of a technology such as silicon on insulator (SOI). The effects of SEU, SET, and/or SEFI can result in a serial communication line (commonly referred to as a lane) to go into an invalid state (possibly due to a loss of lock in the clock circuitry or an induced error in the control logic) in which valid data is no longer being transmitted or received for an extended period of time. The rate of occurrence of soft errors in terrestrial applications for a typical semiconductor chip design is significantly lower than the rate of occurrence of SEU, SET, and/or SEFI for the same semiconductor chip design in space applications.

It is against this background that the techniques disclosed herein have been developed.

SUMMARY

Disclosed herein is an integrated analog to digital converting and digital to analog converting (ADDA) RF transceiver for satellite applications, configured to replace conventional analog RF down and up conversion circuitry. The integrated ADDA RF transceiver includes a plurality of radiation tolerant high speed analog to digital conversion (ADC) units, each configured to take in an RF signal and output a sampled digital signal; an plurality of radiation tolerant high speed digital to analog conversion (DAC) units, each configured to take in a sampled digital signal and output an RF signal; a plurality of radiation tolerant digital inputs; a plurality of radiation tolerant digital outputs; a plurality of radiation tolerant digital signal processing (DSP) cores, each capable of processing data from one high speed ADC unit and outputting the processed data on one or more digital outputs; and a plurality of radiation tolerant digital signal processing (DSP) cores, each capable of processing data from a digital input and outputting the processed data to one DAC unit.

The integrated ADDA RF transceiver may also include selectively providing the output from a single high speed ADC unit to one or more DSP cores. The integrated ADDA RF transceiver may also include providing the output from one or more DSP cores to a single high speed DAC unit. The DSP core may includes: a digital mixer operative to perform frequency translation of data from RF to baseband or from baseband to RF; a decimating filter operative to suppress aliasing and downsample a frequency downconverted baseband signal to its information bandwidth, to reduce the output data rate; and an interpolating filter operative to suppress images while upsampling a baseband signal to the output sample rate prior to frequency upconversion, to reduce the input sample rate.

The digital frequency synthesizer may include a lookup table (LUT) storing a sampled sinusoid; and a digital phase accumulator, wherein phase is encoded as an integer value mapping to a lookup table address. The digital phase accumulator may be incremented, and a sample is produced from the LUT at the corresponding address. The DSP core may include: a cascade of decimating frequency translating filters, to hierarchically downconvert and downsample digital data from one of the high-speed ADC units; and a cascade of interpolating frequency translating filters, to hierarchically upconvert and upsample digital data to feed one of the high-speed DAC units.

The integrated ADDA RF transceiver may further include a digital tune frequency input for rapidly changing the up or down translation frequency during operation of the ADDA unit. The integrated ADDA RF transceiver may further include a digital bandwidth selection input for rapidly changing the processing bandwidth, which corresponds to the interpolation or decimation ratio. The integrated ADDA RF transceiver may further include a TDMA time slot power activation-deactivation time synchronization input, to save power when operating during the inactive portion of a TDMA frame. The digital inputs and outputs may include a configurable complex floating point data converter to conserve digital data input and output communication bandwidth while preserving data fidelity regardless of the interpolation or decimation ratio. The complex numbers may include i and q portions that share one or more bits related to the exponents thereof.

The integrated ADDA RF transceiver may further include radiation hardened flip flops in place of configuration and other registers to ensure operation in a space environment with a low error rate. The transceiver may be implemented on a single monolithic silicon device. The transceiver may be implemented on an ASIC. The transceiver may be implemented on a multi-chip module. The transceiver may be implemented on a hybrid device including active and passive integrated circuit elements.

The integrated ADDA RF transceiver may further include selectively disabling unused digital inputs or outputs when processing less than the maximum bandwidth. The integrated ADDA RF transceiver may further include utilizing flexible data packing of data in the digital outputs and flexible data unpacking of data from the digital inputs.

Also disclosed herein is a method used in a satellite, including: providing an Application Specific Integrated Circuit (ASIC) that: down-converts a first RF signal and converts it to a lower frequency signal; receives the lower frequency signal and converts it to a first digital signal; converts the first digital signal to a second digital signal; receives the second digital signal and converts it to an analog signal; and receives the analog signal and converts it to a second RF signal.

Also disclosed herein is a method used in a satellite, including: providing an Application Specific Integrated Circuit (ASIC) that: down-converts a first RF signal and converts it to a lower frequency signal; receives the lower frequency signal and converts it to a first digital signal; receives a second digital signal and converts it to an analog signal; and receives the analog signal and converts it to a second RF signal.

Also disclosed herein is a method used in a satellite, including: providing an Application Specific Integrated Circuit (ASIC) that: receives a first analog RF signal and converts it to a first digital signal; down-converts the first digital signal to create a lower-frequency second digital signal; receives a third digital signal and up-converts the third digital signal to create a higher-frequency fourth digital signal; and converts the fourth digital signal to a second analog RF signal.

Also disclosed herein is an integrated analog to digital converting and digital to analog converting (ADDA) RF transceiver for satellite applications, configured to replace conventional analog RF down and up conversion circuitry. The integrated ADDA RF transceiver includes a plurality of high speed analog to digital conversion (ADC) units, each configured to take in an RF signal and output a sampled digital signal; a plurality of high speed digital to analog conversion (DAC) units, each configured to take in a sampled digital signal and output an RF signal; a plurality of digital inputs; a plurality of digital outputs; and a plurality of digital signal processing (DSP) cores, each capable of processing data from one high speed ADC unit and outputting the processed data on one or more digital outputs and capable of processing data from a digital input and outputting the processed data to one DAC unit. The entire ADDA RF transceiver is contained in a single package. The circuitry described above is radiation tolerant. The circuitry described above can handle a broad range of RF frequencies and bandwidths.

BRIEF DESCRIPTION OF THE DRAWINGS

The disclosure herein is described with reference to the following drawings, wherein like reference numbers denote substantially similar elements.

DETAILED DESCRIPTION

Figure 1:
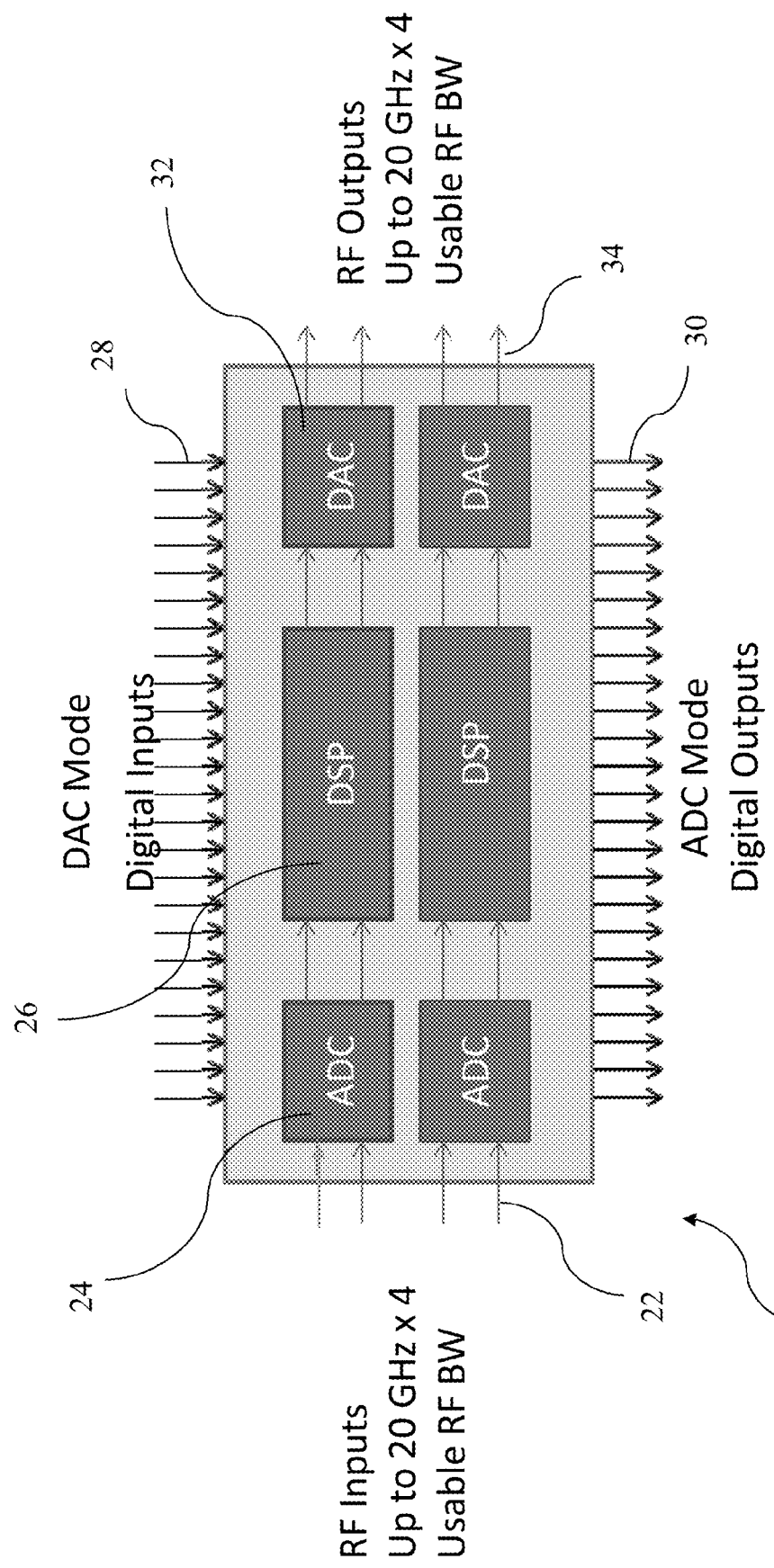
FIG. 1 is a block diagram of an ADDA RF Transceiver ASIC.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The techniques and designs disclosed herein relate solely to the use of such circuitry in satellite-based applications. They include the use of an Application Specific Integrated Circuit (ASIC) for a portion of the down-converting, the analog-to-digital conversion (ADC), the digital signal processing (DSP), the digital-to-analog conversion (DAC), and a portion of the up-converting. Specifically, the DSP on the ASIC can perform certain functionality that earlier designs performed in the analog domain (at a minimum, mixing and filtering). The use of an ASIC in satellite-based applications is challenging because of the radiation affected upsets, transients, and functional interrupts discussed in the background.

In one embodiment, the design is based on a commercially available semiconductor process with a feature size in the range of 14 nm to 45 nm. The ADC may perform at a sampling rate of 64 Gigasamples per second (providing a 20 GHz usable bandwidth). Each of the ADC and the DAC may consume 1.1 Watts per channel. The ADC and DAC units may each include built-in capture/playback buffers.

A simplified ASIC 20 is shown in FIG. 1. In this simplified example, it may have an RF throughput of 80 GHz. It may operate in ADC mode or DAC mode. It may only consume 8 Watts of power at a maximum. The ASIC 20 includes a plurality of RF Inputs 22 that are provided to one or more Analog-to-Digital Converters (ADCs) 24. The digital outputs of the ADCs 24 are provided to one or more Digital Signal Processors (DSPs) 26. A plurality of Digital Inputs 28 are also provided to the DSPs 26, just as a plurality of Digital Outputs 30 are provided from the DSPs 26. Some digital outputs from the DSPs 26 are provided to one or more Digital-to-Analog Converters (DACs) 32. These DACs 32 provide a plurality of RF Outputs 34. It should be noted that the ASIC may be contained on one die or on a plurality of die, all located in the same package.

Figure 2:
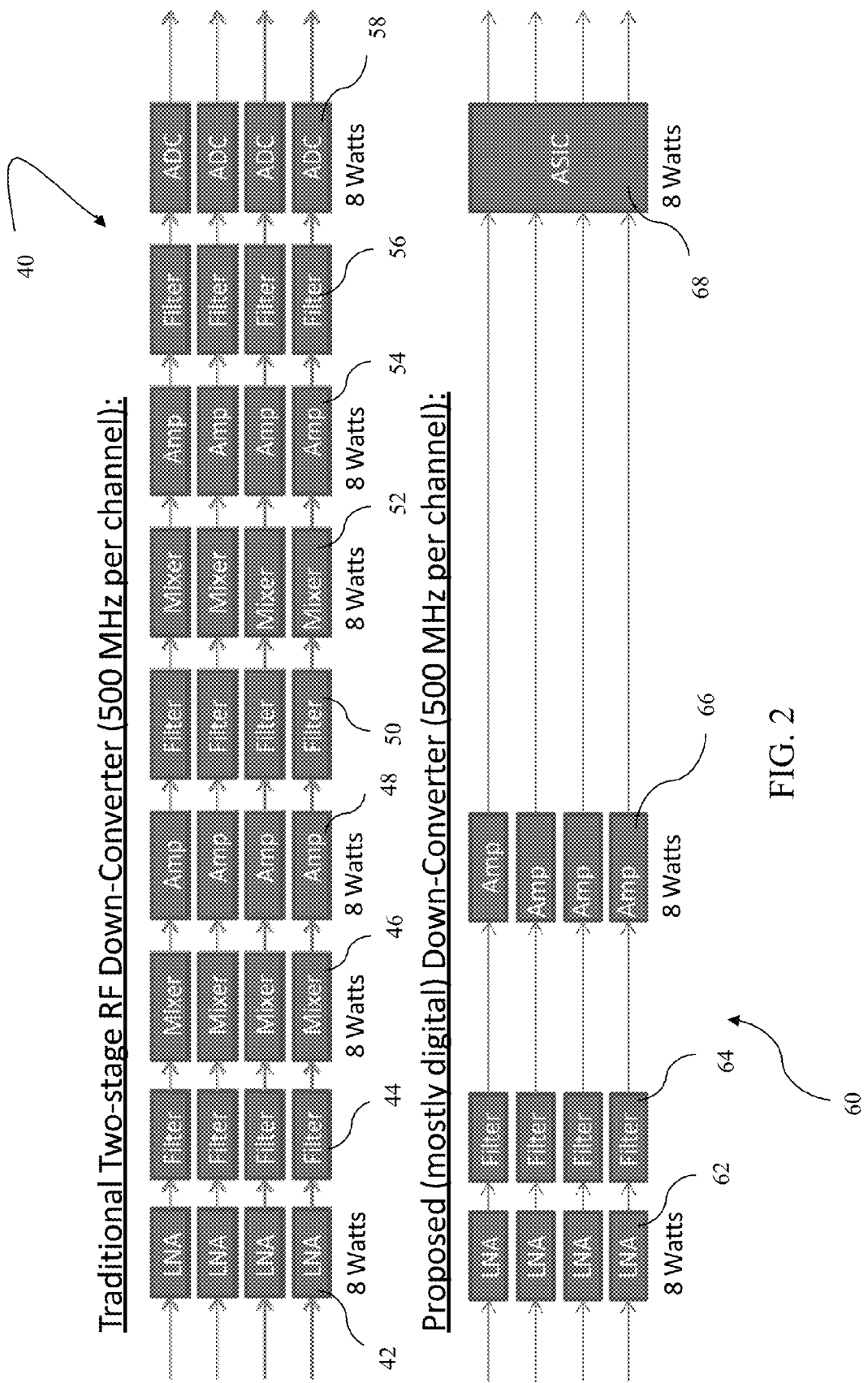
FIG. 2 is a comparison of a prior art technique and the proposed technique for down-conversion.

FIG. 2 compares a traditional two-stage RF down-converter (500 MHz per channel) to a proposed down-converter (500 MHz per channel) that is mostly digital. As can be seen, the new design results in a 50% power reduction and a 63.9% parts reduction. In addition, it is ultra-wide-band capable. A traditional two-stage RF down-converter 40 is shown with a bank of low noise amplifiers (LNAs) 42, followed by a bank of filters 44 (likely bandpass), a bank of mixers 46, a bank of amplifiers 48, a bank of filters 50 (again, likely bandpass), a bank of mixers 52, a bank of amplifiers 54, a bank of filters 56 (again, likely bandpass), and a bank of analog-to-digital converters (ADCs) 58. With the improvements disclosed herein, this down-converter 40 can be replaced with a (mostly digital) down-converter 60 that includes a bank of low noise amplifiers (LNAs) 62, followed by a bank of filters 64 (likely bandpass), a bank of amplifiers 66, and an application-specific integrated circuit (ASIC) described herein. As can be appreciated, the many of the analog and power-intensive components have been replaced with functionality in the ASIC. This is at least partially accomplished by direct conversion of the RF signal to baseband. As an example, it may include 16 input RF channels (of course, the actual number is easily scalable). At 7.5 Watts/channel power consumption, the total power consumption may be 120 Watts. This includes ADCs, amplifiers, and point-of-load converters. As can be appreciated, one design can accommodate many different missions. It may be able to down-convert and digitize any RF, ranging from 100 MHz to 20 GHz. The bandwidth per port may be configurable over the range from 100 MHz to 20 GHz.

One name for the devices disclosed herein may be ADDA, which comes from the first letters of ADC, DSP, DAC, ASIC. As has been discussed, it may be intended to replace conventional RF up/down-conversion circuitry with mostly digital logic. It may be able to go directly from RF frequencies up to Ku band (roughly 20 GHz maximum), or Ka band (roughly 30 GHz maximum). It may be able to support instantaneous bandwidths up to 3 GHz per port. It will be appreciated that and other version of ADDA with more or less inputs, outputs, or components could also be created.

Using the techniques discussed herein, it is possible to achieve typical raw internal sample rates per port of 64 GSps (real) (or 128 GSps or even higher); typical internal digital clock frequencies of 500 MHz; minimum decimation/interpolation 8X→4 GSps complex; maximum decimation/interpolation of 1024x→62.5 MSps complex; and selectable power of two decimation/interpolation.

Complex valued signals have a real and an imaginary component. A complex signal is required to fully unambiguously encode the instantaneous state of an oscillating system into a single number. In a physical system, a complex signal might encode the position and velocity at each instant in time, as kinetic energy and potential energy are exchanged back and forth. In an electrical system, a complex signal would encode the exchange between the magnetic field and the electrical field. Complex signals carry no more information than real valued signals at twice the sample rate, but real valued signals require additional processing, such as a Hilbert transformation, to extract the instantaneous state of the system. Counterintuitively, complex signals thus enable more efficient and simpler processing in many signal processing applications. The format of the information becomes more complex, but the processing of the data becomes less complex.

The DSP may have multiple different personalities or forms/modes/configurations in which it may be used. Specifically, in an input mode, it has the ability to tune to an input RF band of interest, filter, and decimate to a bandwidth of interest. In an output mode it has the ability to interpolate up to the raw output sample rate and digitally up-convert to the output RF of interest. There are multiple modes of operation, which include having four active ADCs, four active DACs, two active ADCs and two active DACs, one active ADC feeding all four DSP cores, and four DSP cores feeding one active DAC. It features flexible data packing/unpacking to/from High-Speed Serial Links. High-Speed Serial Links could include any of a variety of protocols based upon SerDes (Serializer/Deserialzer) technology, including JESD204B, PCI Express, Ethernet, Interlaken, XAUI, Xilinx Aurora, Altera Serial Lite, or many other possibilities. Unneeded SerDes lanes can be turned off to save power. Unneeded ADCs/DACs/DSPs can be turned off to save power. There may be a TDMA time-slot power-up/power-down input pin. In such case, it would be nice to have less than a 100 µs ramp-up/down time. The typical TDMA frame is 100 ms and the minimum/typical/maximum duty cycles are typically 1%/10%/100%.

Reconfigurable DSP elements enable re-targeting frequency design to future implementation technologies. Therefore, no redesign of the DSP is required to support different RF tune frequencies or bandwidths, regardless of the implementation technology. Even if implemented in a technology which enables processing at much higher sample rates, access to higher RF frequencies and bandwidths, the DSP can be programmed by setting its configuration bits to retune accordingly.

Figure 9:
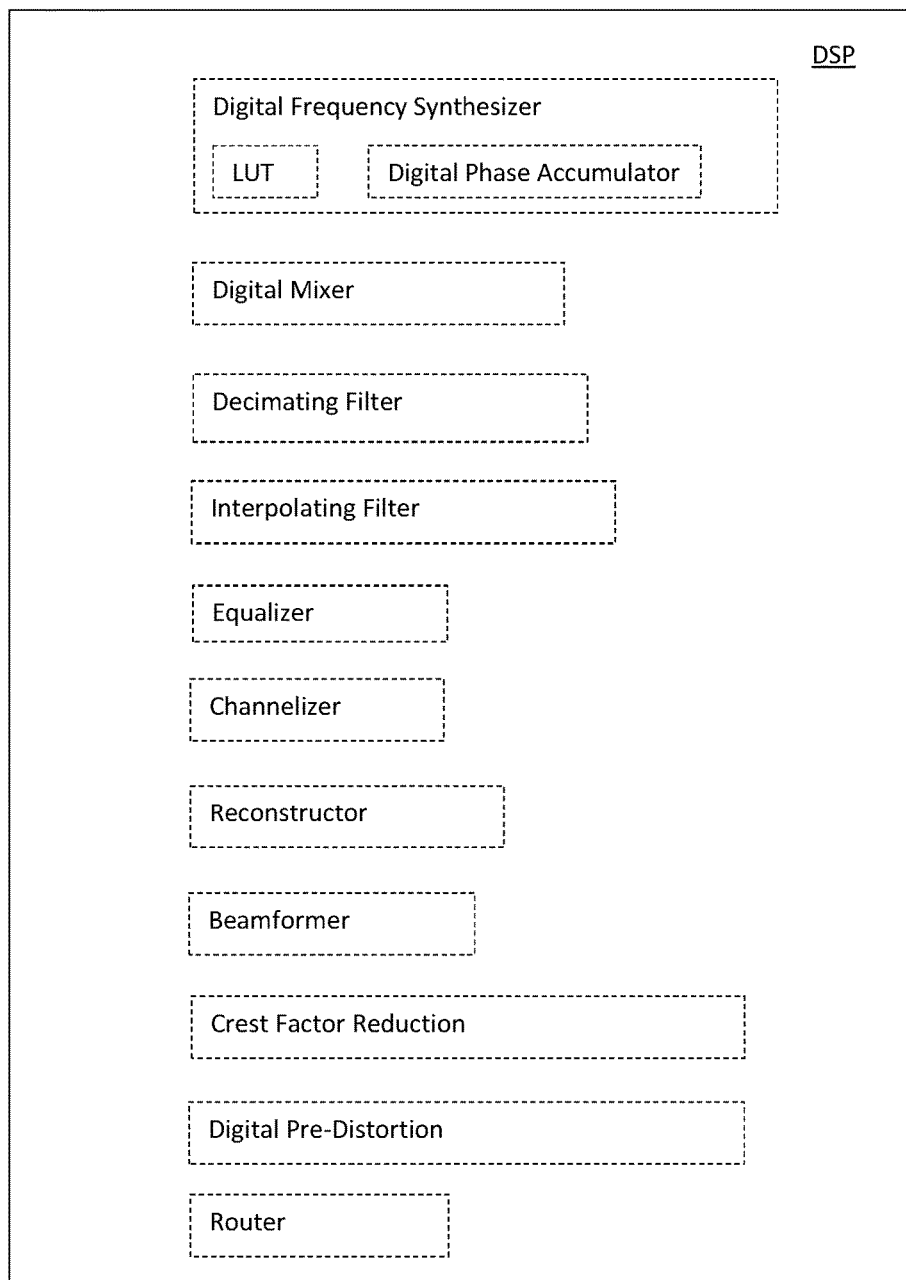
FIG. 9 shows possible features/functions performed by a DSP as disclosed herein.

DSP Feature List—The DSP algorithm includes all of the following features (shown in the DSP of FIG. 9), which are co-optimized and which interact to result in system performance which is greater than the sum of its parts:

Digital Frequency Synthesizer—Frequency synthesis is accomplished via a programmable lookup table (LUT) which stores complex valued samples from one quarter of a sampled sinusoid. An index counter increments the LUT address such that the LUT values are accessed in a linear sequence. When the counter reaches the end of the stored waveform, it resets to zero and starts again. Each time the counter resets, a quarterwave state machine's state is advanced, such that the retrieved sinusoid is manipulated into the correct quadrant of the sinusoid being generated. The combination of a programmable LUT, programmable LUT depth, and quarterwave manipulation results in phase-noise-free sinusoid generation with orders of magnitude more frequency choices available compared with a fixed table length. This enhanced additional frequency resolution improves the performance of a channelized system, and reduces the performance requirements on the channelizer by relaxing its transition band specifications.

Digital mixer—The digital mixer multiplies the signal to be frequency translated by the sinusoid created by the Digital Frequency Synthesizer, and results in a signal whose subcarriers are closely aligned to the channelizer's subchannel centers.

Decimating filter—The decimating filter is used in the Rx direction and consists of a cascade of efficient decimation filters, supporting a configurable number of decimate-by-two operations, followed by a configurable decimate by three or five operation. The configurable decimation selection allows the channelized bandwidth to more closely match the occupied bandwidth of the signal, for improved power efficiency. The decimating filter provides improved roll-off compared to an analog bandpass filtering approach.

Interpolating filter—The interpolating filter is used in the Tx direction and performs the exact inverse operation of the decimating filter, supporting the same interpolation factors as decimation factors. The purpose of the interpolating filter is to upsample a baseband complex signal to a higher sample rate, while limiting the upsampling images.

Equalizer—The equalizer is used to time and phase align multiple channels of data such that they are time, phase, and amplitude aligned across frequency, in order to facilitate beamforming. The programmable equalizer also provides improved filtering versus analog filtering approaches.

Channelizer—The channelizer, which operates in the Rx direction, is configurable to decompose the spectrum into a number of spectrally separated subchannels spanning the passband. This, combined with the beamformer, allows each subchannel to be individually beamformed so that multiple users, each transmitting on different frequencies, can each be assigned their own optimized subchannel-beam, in order to communicate without interference with the other users. Rx subchannel-beams may then be routed independently through the system via the router, to be transmitted on one or more Tx subchannel beams.

An OFDM (orthogonal frequency division multiplexing) filter bank is an alternative to channelization, performing a similar function (spectral decomposition), at a reduced die-area and with reduced power consumption. It is only compatible with systems where the modems on the ground emit waveforms compatible with OFDM, however. i.e., the modems (ground terminals) must ensure they transmit on frequencies which are orthogonal at the receiver (spacecraft).

Reconstructor—The reconstructor operates in the Tx direction, and performs the opposite function of the channelizer. It combines multiple subchannels together into a single wider bandwidth signal for driving the DAC.

Beamformer—The beamformer operates in both Tx and Rx directions. In the Rx direction, it combines multiple subchannels from different antenna elements but at the same frequency together to form input subchannel-beams, using spatial diversity to isolate multiple users transmitting on the same frequency. In the Tx direction it spreads information from each user out across multiple output antenna elements such that the desired beams are radiated via the coherent combination of the element patterns. The digital beamformer enables flexible beamforming and beamsteering, which provide the following benefits:

Widening of beam spacing to enable full coverage with partial constellation.

Narrowing of beam spacing to provide increased density and revenue for fully populated constellation.

Beam steering to target specific users, or to provide improved non-interference.

Digital beamforming enables power increase for one of the beams to counter adverse weather or to increase capacity, at the expense of the other beams.

Crest Factor Reduction (CFR)—CFR operates in the Tx direction to improve the NPR of a multicarrier beamformed signal, prior to the DAC.

Digital Pre-Distortion (DPD)—DPD operates in the Tx direction to apply the opposite distortion to the signal that the amplifier will apply, such that the combination of the DPD followed by the amplifier behaves like an ideal soft limiter, allowing the amplifier to driven at a reduced backoff for a given NPR requirement.

Router—In the Rx direction, the router routes beamformed subchannel data from the input to the appropriate SerDes lane(s) such that it will be received by the desired downstream chip. In the Tx direction, the router routes beamformed subchannel data from the input to the appropriate DSP path such that it may be output by the desired DAC.

Built-in high-resolution ADC and DAC units may contain calibration and built-in self test (BIST) functionality. They may be able to stimulate the inputs to the ADC units and collect/analyze outputs of the DAC units. They may include built-in capture/playback buffers. The BIST algorithm may be able to validate the ADDA unit with a simple test fixture. The calibration may include LUT-based linearization of each sub-ADC/sub-DAC.

While various specific types of communication interfaces such as SerDes, JESD204, and JESD204B have been discussed herein, it should be understand that the teachings herein are equally applicable to any type of digital communication interface that include one or more signal lines, operating in serial or parallel fashion. Additional communication interfaces also include optical communication, proximity communication, and wireless communication. Optical communication uses photons rather than electrons for communication. Proximity communication utilizes capacitive coupling rather than direct connection via wires. Wireless communications includes interfaces such as WiFi including interfaces compliant with IEEE 802.11, Zigbee including interfaces compliant with IEEE 802.15.4, and BlueTooth including interfaces compliant with IEEE 802.15.1.

Due to the ionizing radiation environment experienced by electronics operating in satellite applications, it may be desirable for all or portions of the electronics to be radiation hardened or radiation tolerant. This can include any or some combination of electronics that have been radiation hardened by process (having to do with the underlying semiconductor technology regarding how the electronic device is fabricated), by design (having to do with the physical layout of the circuit elements on the die) or by other means. Radiation tolerance may be determined via test, analysis, or test and analysis of devices whose design was not intentionally optimized for use in an ionizing radiation environment.

The harsh environment faced by a satellite can increase the challenge of designing electronic circuitry. One of the primary environmental risks in a satellite application is associated with the ionizing radiation environment present in space. It should be noted that radiation effects associated with ionizing radiation are also present in terrestrial applications and such radiation effects are generally termed soft errors. The ionizing radiation environment in space includes heavy ions, protons, and neutrons which can impact the normal operation of semiconductor devices via single event effects (SEE), total ionizing dose (TID), and/or displacement damage dose (DDD). The effects of TID and DDD are generally cumulative over the mission duration and impact semiconductor parameters including current leakage. The effects of SEE are generally instantaneous and can impact the operation of the semiconductor circuit. These SEE effects include single event latchup (SEL), single event upset (SEU), single event transient (SET), and single event functional interrupt (SEFI). Mitigation for SEL can be provided via use of a technology such as silicon on insulator (SOI). The effects of SEU, SET, and/or SEFI can include causing a serial communication line (commonly referred to as a lane) to go into an invalid state (an example would be loss of lock) in which valid data is no longer being transmitted or received for an extended period of time. The rate of occurrence of soft errors in terrestrial applications for a typical semiconductor chip design is significantly lower than the rate of occurrence of SEU, SET, and/or SEFI for the same semiconductor chip design in space applications.

The mitigation of SEU, SET, and/or SEFI in semiconductor chip designs for space applications can be performed using a variety of techniques including the selection and optimization of materials and processing techniques in the semiconductor fabrication (radiation hard by process (RHBP)), and by the design and fabrication of specialized structures in the design of the chip which is then fabricated via conventional materials and processes in the semiconductor fabrication process (radiation hard by design (RHBD)). There are additional techniques for providing system level mitigation in systems that include semiconductor chips that are either RHBP, RHBD, or conventional (not specifically optimized for use in an ionizing radiation environment), such SEU, SET, and/or SEFI mitigation techniques are referred to in this application as system level radiation mitigation techniques (SLRMT).

The effective design of electronics systems for use in the space ionizing radiation environment requires that the system design team make effective and efficient use of components that are either RHBP, RHBD, and/or conventional and often includes the use of SLRMT. The optimization of the component selection and SLRMT depends to a large extent on the specific details of the radiation effects that are to be mitigated and the desired level of system radiation tolerance to be obtained. Many SEU, SET, and/or SEFI are generally best mitigated as close as possible, both spatially and temporally, to where the SEE induced event occurred in the component or system level circuit to provide effective and efficient mitigation of such effects. For example, the duration of SET induced in ASIC technology nodes with a feature size <90 nm, can be <1 nSec., and can be as short as several tens of pSec for feature sizes <32 nm. The mitigation of such short duration SET within the same semiconductor package can provide for a more efficient implementation of SET mitigation relative to an approach which spans two of more chips in separate locations within the same system. This efficiency results from the ability to detect and mitigate spatially and/or temporally close to the source of the SEE induced errors.

Radiation test may be accomplished using a beam of charged particles from a particle accelerator where the charged particle beam may include protons and/or heavy ions and the accelerator may be a cyclotron or a linear accelerator. The beam energy in the case of a proton beam may be in the range of 0.1 MeV (mega-electronVolt) to over 200 MeV and is typically in the range of approximately ≥1 MeV to either approximately 65 or 200 MeV. The beam in the case of a heavy ion beam may have a linear energy transfer (LET) in the range of 0.1 to over 100 MeV cm$^2$/mg (square centimeters per milligram) and is typically in the range of ≥0.5 to approximately 60 to 85 MeV cm$^2$/mg. The total fluence of particles used in such tests can vary considerably and is often in the range of $10^6$ to over $10^{12}$ particles per cm$^2$ at each beam energy in the case of a proton beam and is often in the range of $10^2$ to over $10^8$ particles per cm$^2$ at each LET value in the case of a heavy ion beam. The number of radiation induced upsets (SEU), transients (SET), and/or functional interrupts (SEFI) is often expressed as a cross section which relates to the number of observed events in a given area (typically 1 cm$^2$) as a function of the beam fluence. The cross section is no greater than 1.0 and can be smaller than $10^{-10}$ cm$^2$, it is often in the range of approximately $10^{-2}$ to $\leq 10^{-10}$ cm$^2$. A device is generally considered to be radiation tolerant if the number of detected SEU, SET, and/or SEFI is sufficiently small that it will not have a significant impact on the operation of the system or circuit containing one or more instances of that device. A heavy ion cross section $\leq 10^{-4}$ cm$^2$ at a LET $\geq 37$ MeV cm$^2$/mg as demonstrated by test and/or analysis is an example of a cross section which may be sufficient to be demonstrate that a given device is radiation tolerant. The heavy ion or proton cross section that is measured or determined by analysis for a device at one or more beam LET values or beam energy values to be considered radiation tolerant may vary considerably and depends in part on the anticipated orbit for the satellite and the extent to which the circuit and/or system containing that device is capable of maintaining the desired operation when a SEU, SET, and/or SEFI occurs.

Figure 4:
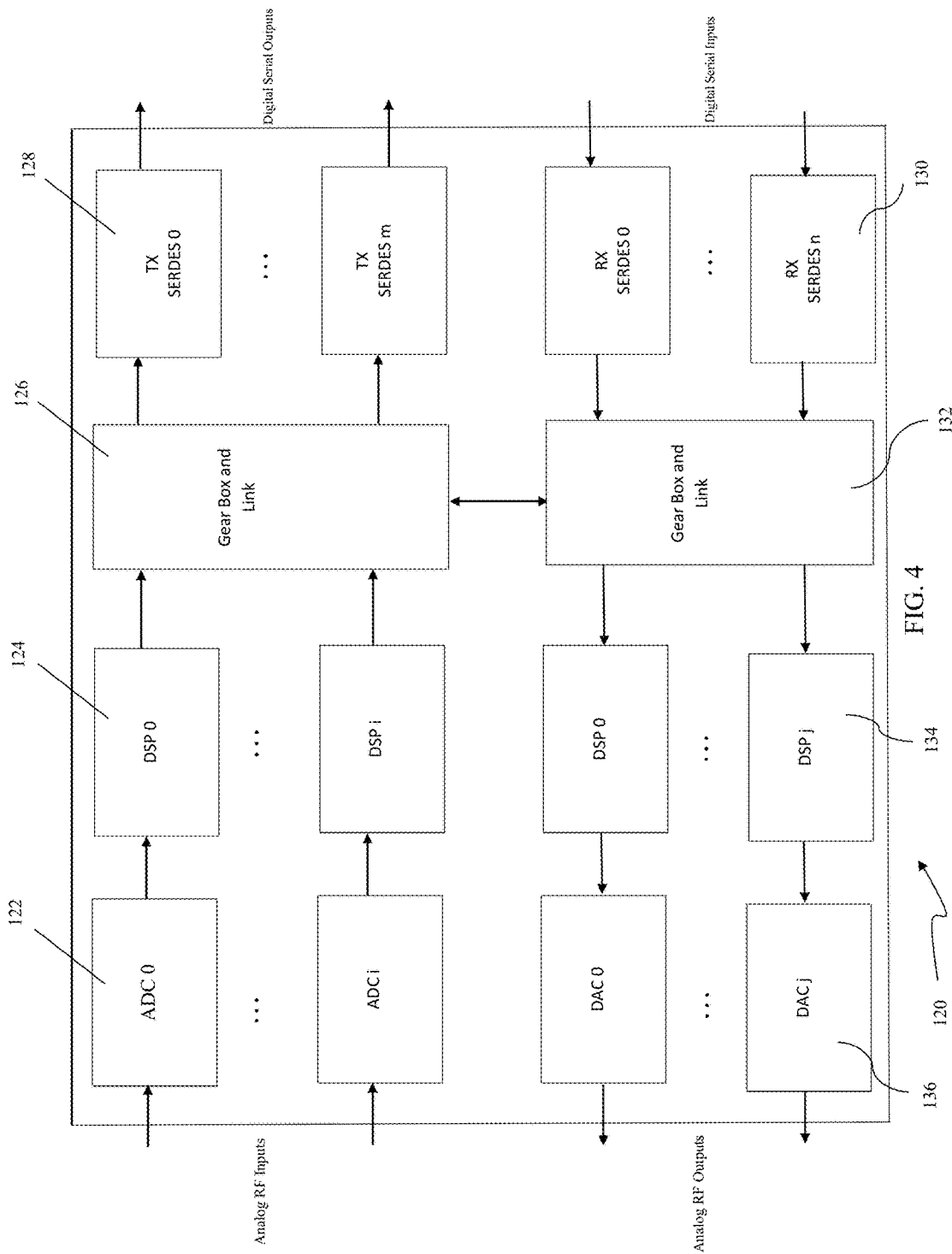
FIGS. 4-8 are different examples of manners in which the ASIC could be configured or used, with various components selectively powered off.

FIG. 4 shows one arrangement. In this case, an ASIC 120 includes a plurality of ADCs 122 that receive analog RF inputs and provide outputs to a plurality of DSPs 124. The outputs of the DSPs 124 are provided at the DSP clock rates to a Gear Box and Link 126 that matches/converts the DSP clock rate data to the serial rate of a plurality of SerDes Transmitters 128 (actually, to the aggregate serial bandwidth). The Gear Box and Link 126 also exchanges data with another Gear Box and Link 132 which receives serial data of a plurality of SerDes receivers 130 (at the serial rate). The Gear Box and Link 132 matches/converts incoming data to the DSP clock rates of a plurality of DSPs 134, which in turn provide outputs to a plurality of DACs 136. Flexible data packing (as discussed in further detail below) is implemented in the Gear Box and Link 132.

Figure 5:
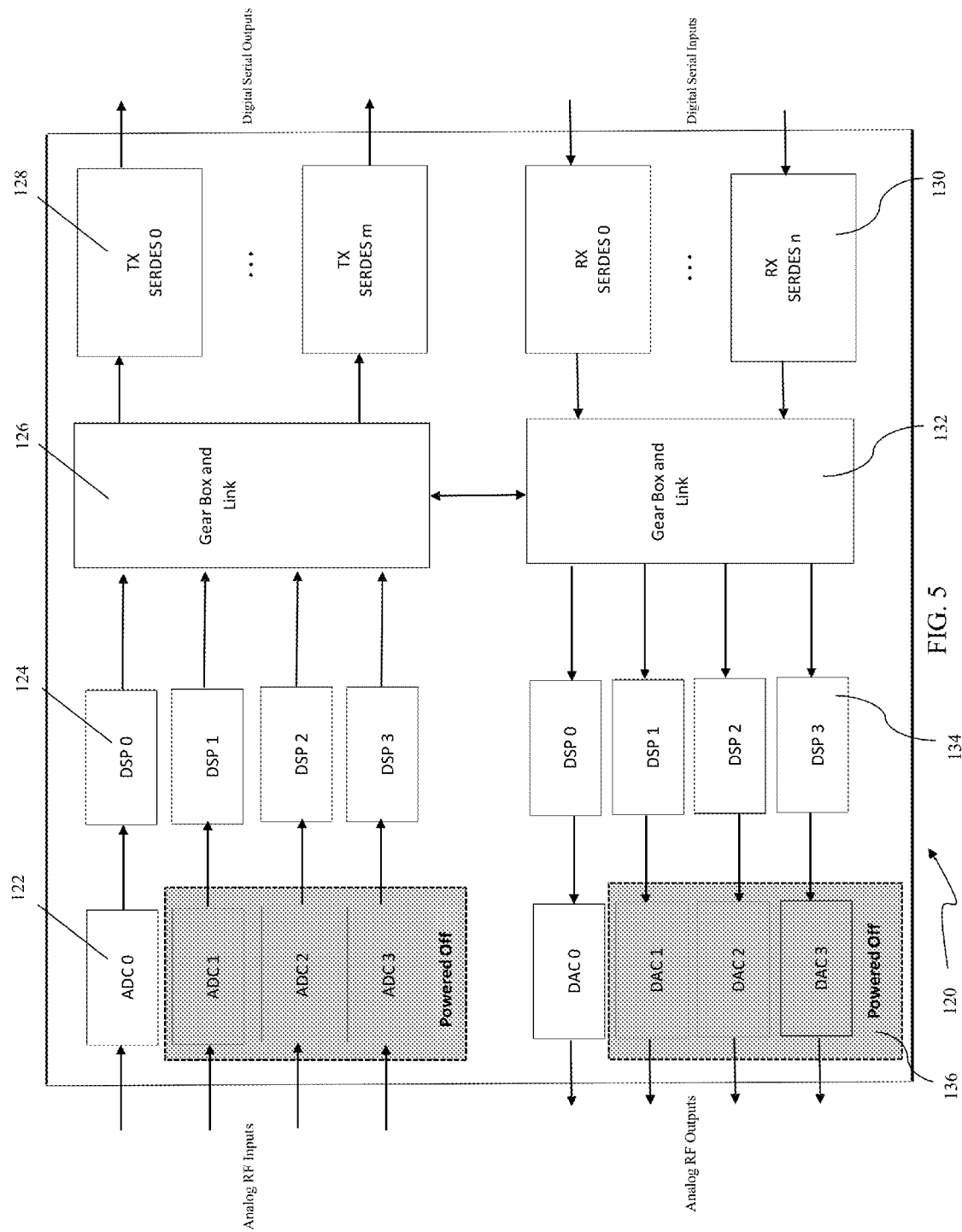
Figure 6:
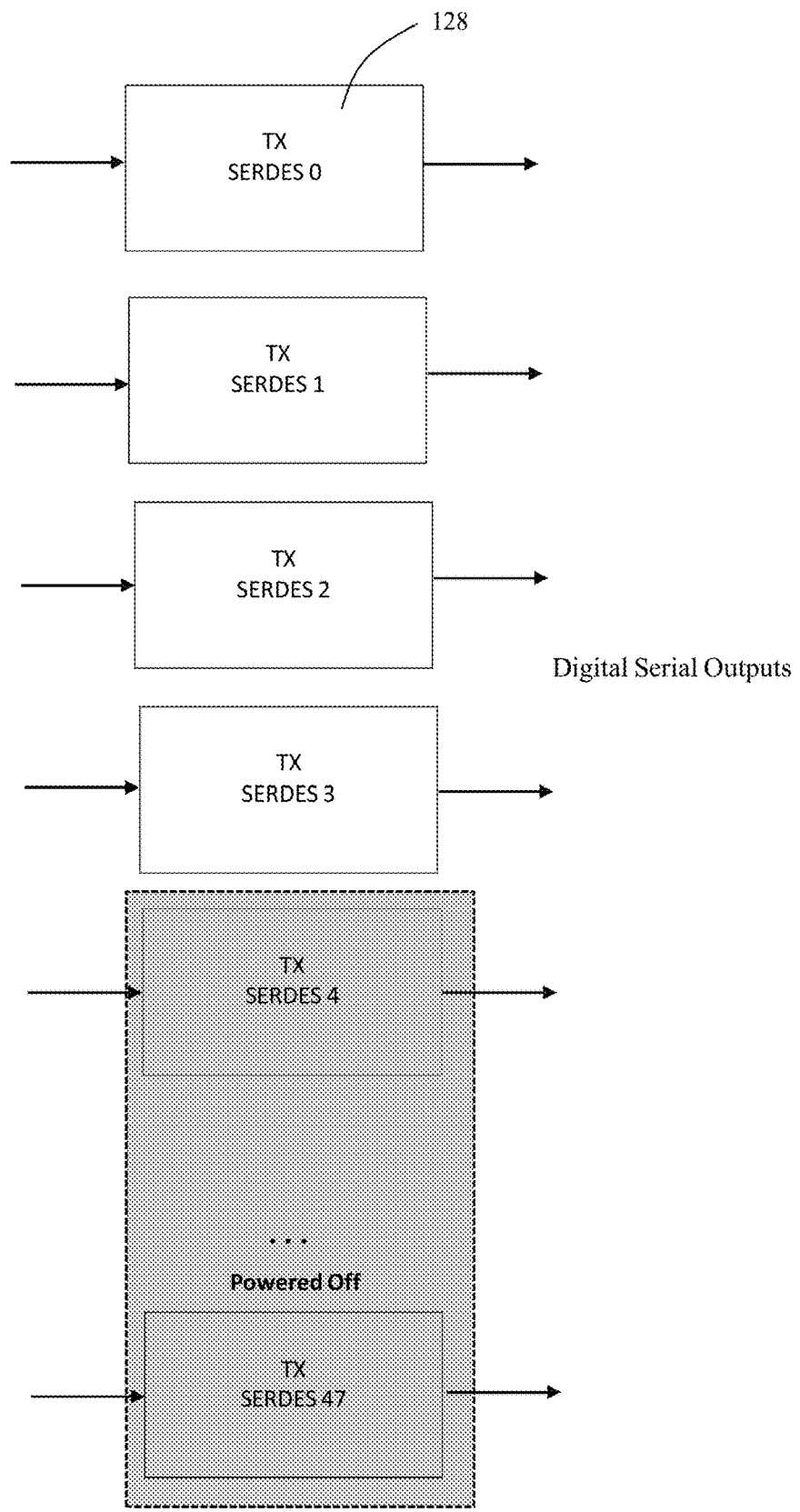
Figure 7:
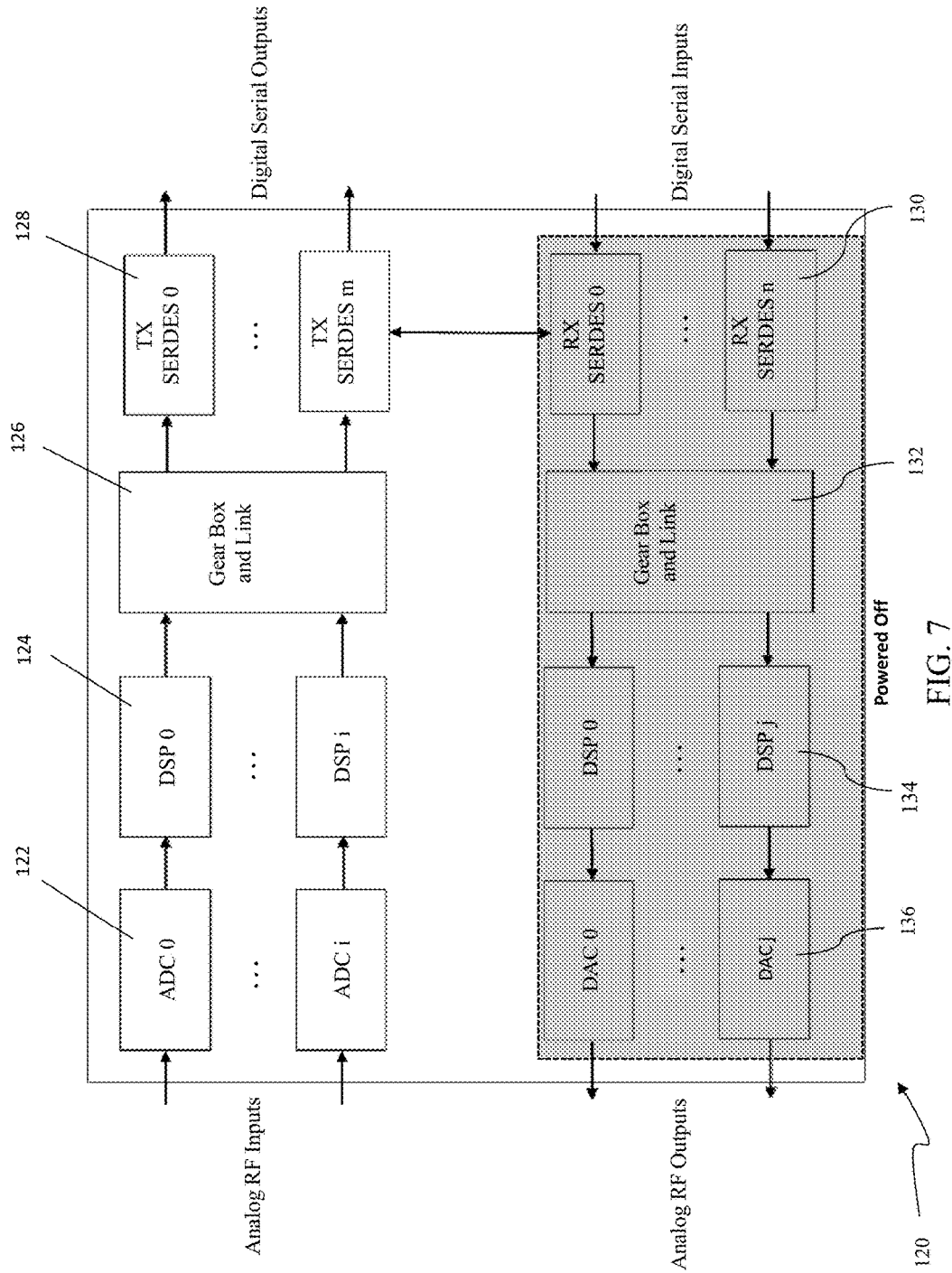
Figure 8:
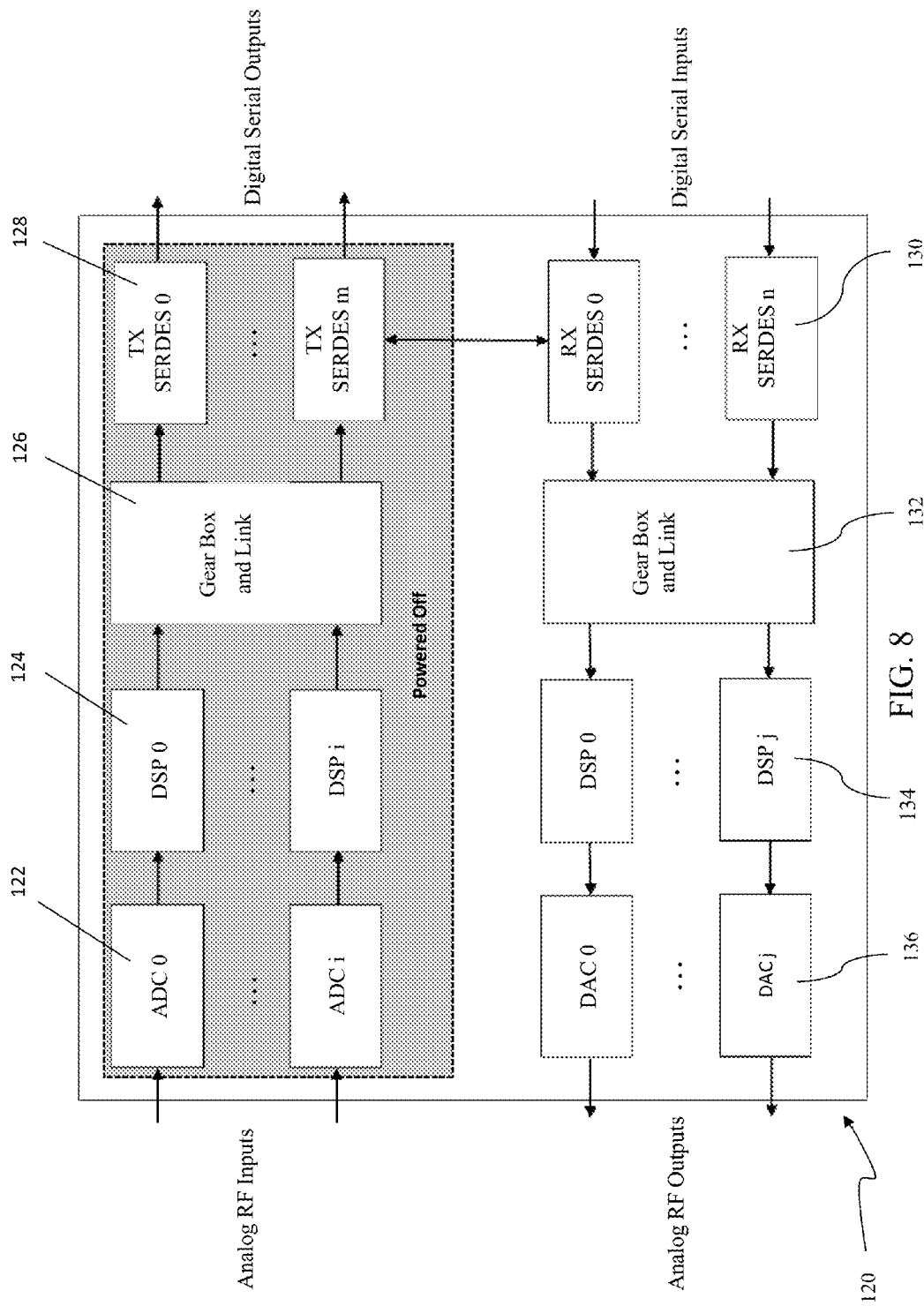

FIG. 5 shows a similar arrangement in which three of the four ADCs 122 have been powered off (or placed into a low power mode) as they were not necessary for this arrangement (because a single ADC/DAC pair can connect to the DSP processing logic). In this case, three of the four DACs 136 have also been powered off. FIG. 6 shows a portion of a similar arrangement in which all but four of the SerDes transmitters 128 have been powered off (or placed into a low power mode). FIG. 7 shows a similar arrangement in which the entire lower half (converting serial digital inputs to analog RF outputs) of the ASIC 120 of FIG. 5 has been powered off. FIG. 8 shows a similar arrangement in which the entire upper half (converting analog RF inputs to serial digital outputs) of the ASIC 120 of FIG. 5 has been powered off. As can be appreciated, many other alternative arrangements are also possible with this ASIC 120 and the teachings herein.

The terms signal and waveform are used herein and can be interchangeable. All frequency ranges and other numerical and quantitative values used herein are merely examples and are not intended to be limiting to the concepts described herein. The terms high speed and low speed used with regard to ADC units and DAC units are intended to differentiate between those operating at the RF frequencies at the inputs and outputs of the ADDA RF transceiver and those operating at lower frequencies internal to the ADDA RF transceiver. By way of example only, low speed ADC and DAC units may be used internally to achieve calibration, BIST, and dither functionality.

The integrated ADDA RF transceiver for satellite applications described herein may be entirely, or largely, implemented on a single monolithic silicon device. For example, it could be implemented on an ASIC. Alternatively, it could be implemented on a multi-chip module or on a hybrid device including active and passive integrated circuit elements.

It should be appreciated that the concepts disclosed herein could be used to implement only a portion of an ADDA RF transceiver. For example, this could include ADC units and DSP cores or it could include DSP cores and DAC units. Similarly, an ADDA RF transceiver could be designed so that portions thereof could be selectively made operational or non-operational. In this manner, an ADDA RF transceiver could have ADC units, DSP cores, and DAC units and either the ADC units or the DAC units or portions of the DSP cores (or some combination of these) could be made non-operational. This could be achieved via power islanding, clock gating, or any other suitable means. Having only portions of the ADDA RF transceiver in a design or only portions operational may be desirable from a SWaP perspective or in order to reduce IP licensing costs.

It should also be appreciated that look-up tables (LUTs) in the harsh environments experienced by satellites may tend to become corrupted over time. Suitable mitigation strategies include but are not limited to the use of Error Detection and Correction (ED&C), error detection and substitution, error detection and approximation, and background scrubbing, among others.

While various specific types of frequency synthesis have been mentioned, it should be understood that any suitable type of frequency synthesis could be used. For example, this could include free-running digital oscillation.

With regard to the configurable complex floating point data converter to conserve digital data input and output communication bandwidth, while preserving data fidelity regardless of the interpolation or decimation ratio, the complex numbers include i and q portions that share one or more bits related to the exponents thereof.

Resolution, when referring to ADCs and DACs, refers to the number of quantization levels. For instance, an 8-bit ADC would have 256 quantization levels ($2^8$=256). Precision is a less specific term relating to the quality of the converter. Despite having a high resolution, a converter may have significant imperfections degrading its precision. As an example, DNL and INL (differential non-linearity and integrated non-linearity) describe different error components imparted on the signal. The effective precision, sometimes referred to as ENOB (effective number of bits), attempts to convey this property. For instance, an 8 bit ADC might have 256 levels, but it might only have an ENOB of 6 bits. This cannot be mapped directly to an effective number of levels, but it does indicate the amount of error one might expect to be added to the signal as a side effect of the analog-to-digital or digital-to-analog conversion process.

Analog to digital converters can be calibrated using a slowly increasing ramp function. In this case, the known ramp function would be compared with the data from the ADC to determine the conversion error, which would then be saved to the calibration table for each ADC code, and for parallel ADCs, there is a table entry for each code/sub-converter combination. Many other waveforms can be used in a similar manner including but not limited to sinusoids, triangle waves, and pseudo-random noise sequences. Likewise, digital to analog converters can be calibrated in a similar way, whereby a known digital waveform is fed into the DAC, and then the DAC's output is captured by an ADC having more precision than the DAC. The difference between the expected and collected signals is calculated and stored to a calibration table. For the purposes of built-in-self-test (BIST), the intent of test signals is to maximally stimulate all functionality, logic elements and analog/mixed-signal elements, such that any defects in the as-built hardware have a high-probability of distorting observables of said stimulus signal significantly enough to be easily detectable with a high probability. Many waveforms exhibit the necessary and sufficient characteristics to support such BIST functionality, including but not limited to some but not all classes of pseudo-random noise sequence.

Applying ADC calibration includes taking each ADC output sample and using it to index into the calibration table. The calibration table either stores the error or the corrected sample at an index corresponding to the value of the corresponding ADC code. In the case that the table stores the error (which requires fewer bits and thus a smaller table), the error is added to the sample and output as the corrected (calibrated) sample. In the case that the table contains the corrected sample, the corrected sample is output directly. For DACs, the calibration table either stores a correction to apply to the digital data prior to feeding the DAC, or it stores the pre-corrected (pre-compensated) sample.

Note that it is intended for the calibration feature to not only be capable of correcting for imperfections in the ADC and DAC, but also, to correct for or partially correct for imperfections in the analog RF front-end and back-end components, outside of the ADDA. These effects include, but are not limited to, amplifier compression (IP3) and other memoryless, nearly memoryless, or partially memoryless non-linearities.

A dither signal, as it relates to digital signal processing, refers to a special waveform which is added to the signal of interest in order to reduce the spectral distribution of spurious signal energy as the signal interacts with a non-linearity. When a signal passes through a non-linearity, harmonics (copies) of the signal are spread across the spectrum. The amplitude of these copies is determined by the severity of the non-linearity. Example non-linearities include but are not limited to the quantization steps of a quantizer as found in an ADC, or the DNL or INL of an ADC or a DAC. A dither signal is designed such that after it is added to a signal, and then the signal passes through a non-linearity, the harmonics (copies) of the signal generated by the non-linearity land at time-varying locations across the spectrum and/or with time-varying phase. This prevents the harmonics from coherently summing-up as constructively as they would have without the dither, thus reducing their effective amplitude. In the parlance of the art, the harmonics (spurs) are therefore "decorrelated." The total energy of the spurs cannot be reduced, but their spectral content can be (and is) spread out across the spectrum, such that it is not as tightly concentrated in small spectral regions. In practical application, a well-designed dither signal can spread the spur energy nearly uniformly across the spectrum. Some classes of dither signal such as wide-band pseudo-random noise sequences have the unfortunate side effect of adding noise into the signal's bandwidth, thus degrading its effective SNR. Disclosed here is a method for eliminating or reducing this degradation by coherently subtracting the known dither signal from the signal after it passes through the non-linearity, thus reducing or eliminating the SNR degradation due to the dither signal. Another embodiment would place the dither signal out-of-band, such that a band-select filter, isolating the signal-of-interest, would eliminate or reduce the dither signal energy thus reducing or eliminating the associated SNR degradation.

Baseband, as referred to herein, describes a signal which is band-limited to its information bandwidth and frequency centered such that it can be decimated to its information bandwidth and remain free of aliasing. Therefore, frequency converting a signal to be centered in the third Nyquist zone could be considered converting it to baseband, since a subsequent decimation operation could result in an alias-free representation of the signal. Such a decimation operation in this case would perform a down-conversion operation translating the signal into the first Nyquist zone relative to the output sample rate, thus satisfying the above definition of "baseband".

A signal can be down-converted (frequency translated), bandwidth-limited (filtered), and down-sampled (decimated) using a single stage approach including a mixer (for down-converting via a homodyne or heterodyne approach to convert the signal to baseband or to an intermediate frequency (IF)), a filter, and a decimator. Alternatively, a signal can be downconverted in stages with coarse filtering, mixing, and decimation, such that the cascade of operations exhibits the net desired effect. Likewise, up-conversion can be implemented by analogous inverse methods. The hierarchical approach may work well for applications requiring less frequency, bandwidth, or sample rate selection resolution, and the non-hierarchical approach may work well where more selection resolution is desired. Further, the decimating and filtering functions are often performed together by a decimating filter. Similarly, the interpolating and filtering functions are often performed together by an interpolating filter.

Direct RF to digital and digital to RF conversion reduces system cost and power consumption. This reduction stems from the elimination of complexity, reducing touch labor and opportunities for mistakes, as well as reduction in parts count with the associated improvement in reliability. Power consumption is reduced by the elimination of RF mixers, which then require less amplification in the RF paths, as well as less companion circuitry such as precision frequency synthesis.

Figure 3:
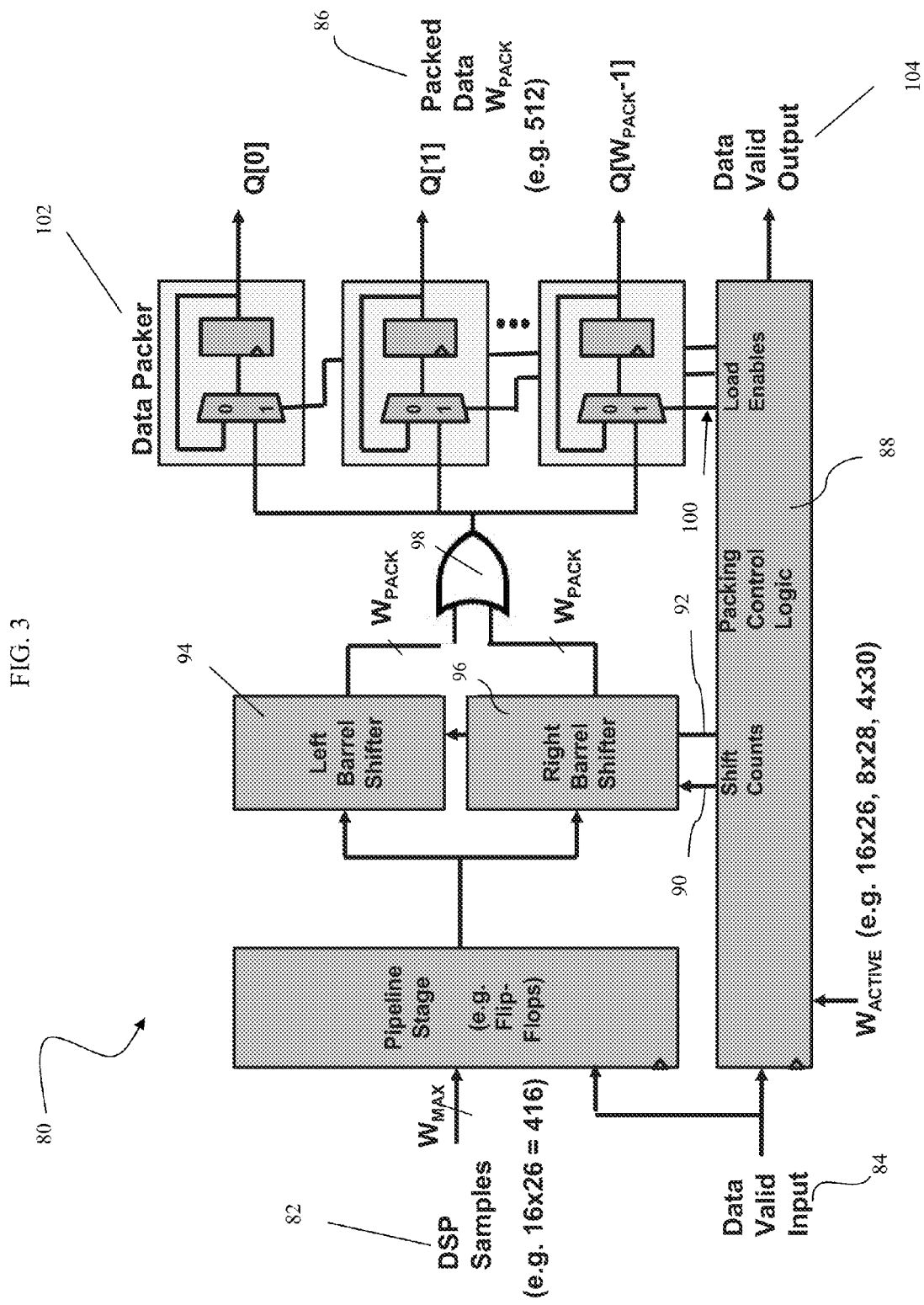
FIG. 3 is a logical schematic of flexible data packing.

Flexible data packing can be used to pack data as tightly as possible into the available digital output bandwidth. On the input side, it includes unpacking like-packed data. Both the packing and unpacking need to be flexible to account for the selectable processing bandwidths (interpolation/decimation ratios) and the configurable I/O bandwidth. FIG. 3 illustrates an example of flexible packing logic circuitry 80 which can receive DSP samples 82 in multiple widths and stacking factors, qualified by a Data Valid input 84 and pack them to a fixed block size (e.g. $W_{PACK}$=512-bits) in packed data 86 for efficient transmission over the serial (SERDES) interface.

Packing Control Logic circuitry 80 is configured to the desired DSP sample format based upon the size and stacking factor of incoming DSP samples 82. For example, in one mode of operation, 8 DSP samples of width 28-bits (14-bits Real +14-bits Imaginary) are processed. In this mode, the active width of the packing logic WACTIVE is set to 224-bits. Packing Control Logic 88 keeps track of the current packing position and outputs Left Shift and Right Shift counts 90 and 92 to barrel shifters 94 and 96. The output of the barrel shifters are combined, for example, via logical OR gates 98, to handle all sample wrapping scenarios. Packing Control Logic 88 generates a Load Enable 100 for each bit position of the Data Packer 102 (e.g. 512-bits). Once a block has been completely filled, the output is qualified by setting Data Valid Output 104, and a new packing operation begins using partial samples from the previous cycle (if any) and future DSP samples.

For transmit operations, once data has been packed to a suitable block size, redundancy or Error Correction Code (ECC) symbols may be generated and combined with the data into codewords to allow the possibility of Forward Error Correction (FEC). Multiple codewords may be combined into packets which are framed by the Link Layer or Physical Coding Sublayer (PCS). The PCS layer will format the data for transmission over the SERDES interface by adapting to the SERDES parallel data interface width and clock frequency (i.e. gearbox operation) and by optionally adding channel coding and/or scrambling to the data stream, commonly using a DC-balanced code (such as 8b/10b or 64b/67b) or a pseudo-balanced code such as 64b/66b. The PCS layer may also insert other symbols into the data stream including packet or burst framing control, synchronization/channel bonding words, scrambler seeds, flow control words, idle words for clock compensation, status words, or hash codes (such as CRC) for enhanced error detection.

There are many PCS/Link layer protocols used in the industry including JESD204B, PCI Express, Ethernet, Interlaken, XAUI, Xilinx Aurora, Altera Serial Lite, or many other possibilities.

For the receive direction, the inverse sequence of operations would typically by performed, while performing lane deskew/channel bonding, error detection and reporting/correction. The receive path would remove any PCS layer and framing overhead, and ultimately return packed data blocks to flexible unpacking logic (the inverse of flexible packing logic shown in Figure X) as described above, which would ultimately return the appropriately sized samples to the DSP processing core(s).

Similar unpacking logic may be used for data received over the serial (SERDES) interface to convert packed blocks into variable sized DSP samples.

A variety of techniques and features have been disclosed herein. It should be understood that all possible combinations of these techniques and features could be used, from any one of them through all of them together.

As can be appreciated some of the advantages of the techniques and features disclosed herein are:
  Replacement of RF downconverter and RF upconverter with digital technology
    Reduced power consumption compared with conventional RF
    Higher level of integration
      Less test time
      Less development cost/schedule
      More reliable
    Low phase noise digital mixer
    Efficient & high performance bandwidth selection
    Multiple bands processed from single input
      BIST to reduce cost
    Built-in digital cal (high res ADC and DAC cores built in+calibration Look Up Tables (LUTs))
      Reduces cost
      Improves SFDR
      . . . including amplifier non-linearity compensation
    Dither to improve SFDR
      At least before DAC
      In conjunction w/ADC
    Supports power savings through TDMA power gating
    Custom complex float to preserve precision versus selected bandwidth
      Flexible data packer supports above and below feature(s)
  Selectively radiation-hardened via hard flip flop and careful TMR
  Rapid BW and tune-frequency reconfiguration supports tipoff-queuing architecture for electronic warfare
  Wide instantaneous bandwidth support to reduce number of RF paths
    Reduced SWAPC, overall
  Wide sampling bandwidth and flexible filtering/decimation
    flexible ENOB (not stuck with fixed ENOB)
  Supports sub-ns or sub-us tune times (effectively reciprocal of BW). Much faster than analog tuning
    No redesign to support other RF tune frequencies or bandwidths. One size fits all from now into the future.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. An integrated digital to analog converting RF transmitter implemented in a satellite, comprising:
   a plurality of radiation tolerant high speed digital to analog converters (DACs) units, which each receive a sampled digital signal and output an RF signal;
   a plurality of radiation tolerant digital inputs; and
   one or more radiation tolerant digital signal processing (DSP) cores, which each process data from one or more of the radiation tolerant digital inputs and output the processed data to at least one radiation tolerant high speed DAC;
   wherein one or more of the radiation tolerant high speed DACs, the one or more of the radiation tolerant digital inputs, and/or the one or more radiation tolerant DSP cores have been determined, by testing, to be radiation tolerant and have a heavy ion cross section less than or equal to $10^{-4}$ cm$^2$ (square centimeters) at a linear energy transfer greater than or equal to 37 MeV-cm$^2$/mg (mega-electronVolts-square centimeters per milligram).

2. The integrated RF transmitter implemented in the satellite according to claim 1, wherein the RF transmitter provides an output from the one or more radiation tolerant DSP cores to the one or more of the radiation tolerant high speed DACs.

3. The integrated RF transmitter implemented in the satellite according to claim 1, wherein the one or more radiation tolerant DSP cores are configured to:
   perform, by a digital mixer of the one or more radiation tolerant DSP cores, a frequency translation of data from baseband to RF; and
   suppress, by a decimating filter of the one or more radiation tolerant DSP cores, images while upsampling a baseband signal to an output sample rate prior to frequency upconversion, and to reduce an input sample rate.

4. The integrated RF transmitter implemented in the satellite according to claim 3, wherein the one or more radiation tolerant DSP cores are further configured to perform a digital frequency synthesis, wherein the digital frequency synthesis includes:
   storing, in a lookup table (LUT) of the one or more radiation tolerant DSP cores, a sampled sinusoid, including a plurality of sampled values; and
   encoding, by a digital phase accumulator of the one or more radiation tolerant DSP cores, a phase by mapping to one of the sampled values;
   wherein a digitized sample is produced by the digital phase accumulator by stepping through the sampled values.

5. The integrated RF transmitter implemented in the satellite according to claim 1, wherein the one or more radiation tolerant DSP cores are configured to provide:
   a cascade of interpolating frequency translating filtering that hierarchically upconverts and upsamples digital data to feed at least one of the radiation tolerant high speed DACs.

6. The integrated RF transmitter implemented in the satellite according to claim 1, further comprising a digital tune frequency input associated with the one or more radiation tolerant DSP cores for rapidly changing a frequency of the data during operation of the RF transmitter.

7. The integrated RF transmitter implemented in the satellite according to claim 1, wherein the RF transmitter further comprises a digital bandwidth selection input for rapidly changing a processing bandwidth of the one or more radiation tolerant DSP cores, which correspond to an interpolation ratio.

8. The integrated RF transmitter implemented in the satellite according to claim 1, wherein the RF transmitter further comprises a time-division multiple access (TDMA) time slot power activation-deactivation time synchronization input associated with the one or more radiation tolerant DSP cores configured to save power of the one or more radiation tolerant DSP cores when operating during an inactive portion of a TDMA frame.

9. The integrated RF transmitter implemented in the satellite according to claim 1, wherein the radiation tolerant digital inputs include configurable complex floating point data conversion configured to conserve digital data input communication bandwidth while preserving data fidelity regardless of an interpolation ratio.

10. The integrated RF transmitter implemented in the satellite according to claim 9, wherein the configurable complex floating point data conversion includes receiving complex numbers that include i and q portions (in-phase and quadrature portions) that share one or more bits related to exponents thereof.

11. The integrated RF transmitter implemented in the satellite according to claim 1, wherein the RF transmitter further comprises radiation hardened flip flops associated with the one or more radiation tolerant DSP cores in place of configuration and other registers configured to ensure operation of the one or more radiation tolerant DSP cores in a space environment with a low error rate.

12. The integrated RF transmitter implemented in the satellite according to claim 1, wherein the RF transmitter is implemented on a single monolithic silicon device.

13. The integrated RF transmitter implemented in the satellite according to claim 1, wherein the RF transmitter is implemented on an Application Specific Integrated Circuit (ASIC).

14. The integrated RF transmitter implemented in the satellite according to claim 1, wherein the RF transmitter is implemented on a multi-chip module.

15. The integrated RF transmitter implemented in the satellite according to claim 1, wherein the RF transmitter is implemented on a hybrid integrated circuit device.

16. The integrated RF transmitter implemented in the satellite according to claim 1, wherein the RF transmitter selectively disables unused radiation tolerant digital inputs when processing less than a maximum bandwidth of the integrated RF transmitter.

17. The integrated RF transmitter implemented in the satellite according to claim 1, wherein the RF transmitter utilizes flexible data unpacking of data from the radiation tolerant digital inputs.

18. The integrated RF transmitter implemented in the satellite according to claim 1, wherein the plurality of radiation tolerant high speed DACs, the plurality of radiation tolerant digital inputs, and the one or more radiation tolerant DSP cores have each been determined to be radiation tolerant by radiation tests comprising:
   directing a beam of charged particles from a particle accelerator onto each of the radiation tolerant high speed DACs, the one or more radiation tolerant DSP cores, and the radiation tolerant digital inputs; and
   determining, for each radiation tolerant high speed DAC, each radiation tolerant DSP core, and each radiation tolerant digital input, one or more of: the number of radiation induced single event upsets (SEU), radiation induced single event transients (SET), and radiation induced single event functional interrupts (SEFI).

19. The integrated RF transmitter implemented in the satellite according to claim 1, wherein the one or more of the radiation tolerant high speed DACs, the one or more of the radiation tolerant digital outputs, and/or the one or more of the radiation tolerant DSP cores are radiation hard by design (RHBD) or radiation hard by process (RHBP) to mitigate at least one of: a single event latchup (SEL), a single event upset (SEU), a single event transient (SET), and a single event functional interrupt (SEFI).

20. The integrated RF transmitter implemented in the satellite according to claim 1, wherein the plurality of radiation tolerant high speed DACs, the plurality of radiation tolerant digital inputs, and the one or more radiation tolerant reconfigurable DSP cores of the RF transmitter are contained in a single package.

21. The integrated RF transmitter implemented in the satellite according to claim 1, wherein the one or more radiation tolerant reconfigurable DSP cores are configured to perform one or more of channelization by a channelizer, reconstruction by a reconstructor, and/or beamforming by a beamformer.

22. An integrated digital to analog converting RF transmitter implemented in a satellite, comprising:
a plurality of radiation tolerant high speed digital to analog converters (DACs), which each receive a sampled digital signal and output an RF signal;
a plurality of radiation tolerant digital inputs; and
one or more radiation tolerant reconfigurable digital signal processing (DSP) cores, which each DSP core processes data from one or more of the radiation tolerant digital inputs and output the processed data to at least one radiation tolerant high speed DAC;
wherein the RF transmitter is implemented in the satellite and one or more of the radiation tolerant high speed DACs, one or more of the radiation tolerant digital inputs, and/or the one or more radiation tolerant reconfigurable DSP cores are radiation hard by design (RHBD) or radiation hard by process (RHBP) to mitigate at least one of single event latchup (SEL), single event upset (SEU), single event transient (SET), and single event functional interrupt (SEFI) radiation effects;
wherein the plurality of radiation tolerant high speed DACs, the plurality of radiation tolerant digital inputs, and the one or more radiation tolerant reconfigurable DSP cores are integrated on a single monolithic silicon device.

23. The integrated RF transmitter implemented in the satellite according to claim 22, wherein RHBD or RHBP mitigation is determined by testing and/or analysis of the one or more of the radiation tolerate high speed DACs, the one or more of the radiation tolerant digital inputs, and/or the one or more of the radiation tolerant reconfigurable DSP cores.

24. The integrated RF transmitter implemented in the satellite according to claim 22, wherein mitigation of the SEL, SEU, SET, and SEFI radiation effects is performed spatially and/or temporally close to the source of the SEL, SEU, SET, or SEFI.

25. The integrated RF transmitter implemented in the satellite according to claim 22, wherein the plurality of radiation tolerant high speed DACs, the plurality of radiation tolerant digital inputs, and the one or more radiation tolerant reconfigurable DSP cores of the RF transmitter are contained in a single package.

26. The integrated RF transmitter implemented in the satellite according to claim 22, wherein the one or more radiation tolerant reconfigurable DSP cores are configured to perform one or more of channelization by a channelizer, reconstruction by a reconstructor, and/or beamforming by a beamformer.

27. An integrated digital to analog converting RF transmitter implemented in a satellite, comprising:
a plurality of radiation tolerant high speed digital to analog converters (DACs), which each receive a sampled digital signal and output an RF signal;
a plurality of radiation tolerant digital inputs; and
one or more radiation tolerant reconfigurable digital signal processing (DSP) cores, which each process data from one or more of the radiation tolerant digital inputs and output the processed data to at least one radiation tolerant high speed DAC;
wherein the plurality of radiation tolerant high speed DACs, the plurality of radiation tolerant digital inputs, and the one or more radiation tolerant reconfigurable DSP cores are integrated and contained on one die or a plurality of die all located in a single package, and at least one of the radiation tolerant high speed DACs, the plurality of radiation tolerant digital inputs, and/or the one or more radiation tolerant reconfigurable DSP cores have been determined, by testing or analysis, to be radiation tolerant.

28. The integrated RF transmitter implemented in the satellite according to claim 27, wherein at least one of the radiation tolerant reconfigurable DSP cores is configured to perform at least beamforming, channelization, and reconstruction.

* * * * *